United States Patent
Prathipati et al.

(10) Patent No.: US 10,481,666 B2
(45) Date of Patent: Nov. 19, 2019

(54) METHOD AND SYSTEM FOR OPTIMIZING COMMUNICATION IN A HETEROGENEOUS NETWORK

(71) Applicant: Samsung Electronics Co., Ltd., Suwon-si, Gyeonggi-do (KR)

(72) Inventors: Bharat Kumar Prathipati, Bangalore (IN); Chethan K Puttanna, Bangalore (IN); Jun-Hyung Kim, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 308 days.

(21) Appl. No.: 15/142,840

(22) Filed: Apr. 29, 2016

(65) Prior Publication Data

US 2016/0320824 A1 Nov. 3, 2016

(30) Foreign Application Priority Data

Apr. 30, 2015 (IN) .............. 2241/CHE/2015

(51) Int. Cl.
*G06F 15/16* (2006.01)
*G06F 1/3209* (2019.01)
*H04L 12/28* (2006.01)

(52) U.S. Cl.
CPC ........ *G06F 1/3209* (2013.01); *H04L 12/2807* (2013.01)

(58) Field of Classification Search
None
See application file for complete search history.

(56) References Cited

U.S. PATENT DOCUMENTS

| | | | |
|---|---|---|---|
| 2011/0045875 A1* | 2/2011 | Rhee | H04B 1/7156 455/574 |
| 2012/0051314 A1* | 3/2012 | Goyal | H04L 9/0833 370/329 |
| 2012/0151028 A1 | 6/2012 | Lu et al. | |
| 2013/0073663 A1 | 3/2013 | Eldering | |
| 2014/0112232 A1* | 4/2014 | Lu | H04W 4/18 370/311 |
| 2015/0063251 A1* | 3/2015 | Asterjadhi | H04W 74/04 370/329 |
| 2016/0302237 A1* | 10/2016 | Gupta | H04W 52/0225 |

FOREIGN PATENT DOCUMENTS

WO 2014/048450 A1 4/2014

OTHER PUBLICATIONS

UPNP; LowPowerDevice: 1 Service Template Version 1.01; LowPowerDevice: 1 Service Template Version 1.0.1-Document Version 1.00; Aug. 28, 2007.

* cited by examiner

*Primary Examiner* — Phyllis A Book
(74) *Attorney, Agent, or Firm* — Jefferson IP Law, LLP

(57) ABSTRACT

Embodiments herein disclose a method and system for optimizing communication in a heterogeneous network. The method includes forming, by a non-constrained device, an association between the non-constrained device and a constrained device, wherein the association is formed by the non-constrained device in response to receiving an association request broadcasted by the constrained device. Further, the method includes sending, by the non-constrained device, sleep information to the constrained device, wherein the sleep information for the constrained device is computed at the non-constrained device based on at least one parameter associated with the heterogeneous network.

16 Claims, 15 Drawing Sheets

Heartbeat message format of constrained
device to non-constrained device

| WAKE_SIGNAL | NFALG |
|---|---|

FIG.4A

Message format of non-constrained
device/controller device to constrained device

| ACK | WARN | TFLAG | SLEEP |
|---|---|---|---|
| <Optional Data> ||||

FIG.4B

METHOD AND SYSTEM FOR OPTIMIZING COMMUNICATION IN A HETEROGENEOUS NETWORK

CROSS-REFERENCE TO RELATED APPLICATION(S)

This application claims the benefit under 35 U.S.C. § 119(a) of an India patent application filed on Apr. 30, 2015 in the Indian Intellectual Property Office and assigned Serial No. IN 2241/CHE/2015, the entire disclosure of which is hereby incorporated by reference.

TECHNICAL FIELD

The embodiments herein relate to heterogeneous networks and more particularly to a method and system to form an association between a non-constrained device and a constrained device in the heterogeneous network.

BACKGROUND

Over the years, smart home technology has been adopted by many users for reasons such as ease of use, monitor, control, security, and energy efficiency. In recent years, the awareness and popularity of the smart homes is increasing multifold. Due to the popularization of the smart homes, it is being tightly coupled with the concept of 'Internet of Things' (IoT). The ever growing popularity of the smart home technology eventually leads to heavy deployment of wireless devices at homes. The deployed wireless devices include different classes of devices which can be categorized based on their availability, durability, and service provided by the devices. All the devices are categorized mainly into resource rich devices (i.e., non-constrained devices) and resource constrained devices.

In existing systems, the constrained devices run all of their services and waits for any external service requests from other external devices such as the non-constrained devices. The constrained devices are forced to keep their radios turned "ON" always to make their presence available for other external devices thus, reducing the battery life of the constrained devices. Further, the constrained devices are forced to retransmit due to congestion in the home network. In order to avoid overhead involved in maintaining state, most of the constrained devices operate in a lossy or constrained networks. Also, in order to save life of their batteries most of the constrained devices employ push based mechanism to pull. In an example, the external device (i.e., client) which needs the service, expected to subscribe for the interested service on the constrained device. The constrained device will notify upon change in its information back to the client.

Further, while notifying the change in the information there are chances that the notification might get lost due to the lossy nature of the constrained networks or due to congestion in the lossy networks. Thus, the constrained device ends up in re-transmitting the notification until it receives an acknowledgement from the non-constrained device; thus, resulting in large and unnecessary wastage of the battery power. The amount of battery power wastage is directly proportional to the congestion of the network, number of retrials before declaring the failure, number of subscribers of the state, and the availability of the subscribers in the network.

Thus, there is a need in the art for a simple and robust method to form an association between a non-constrained device and a constrained device in a heterogeneous network; thereby, saving energy consumption and extending battery life of the constrained device.

The above information is presented as background information only to help the reader to understand the present invention. Applicants have made no determination and make no assertion as to whether any of the above might be applicable as Prior Art with regard to the present application.

SUMMARY

The principal object of the embodiments herein is to provide a method and system for optimizing communication in a heterogeneous network by forming an association between a non-constrained device and a constrained device by broadcasting an association request by the constrained device.

Another object of the embodiments herein is to provide a mechanism to send sleep information to a constrained device, wherein the sleep information for the constrained device is computed at a non-constrained device based on at least one parameter associated with a heterogeneous network.

Yet another object of the embodiments herein is to provide a mechanism for receiving a request by a non-constrained device, for sleep information of a constrained device, broadcasted by a controller device.

Yet another object of the embodiments herein is to provide a mechanism for sending sleep information by a non-constrained device of a constrained device to a controller device, wherein the controller device communicates with the constrained device after receiving a wake-up signal message broadcasted by the constrained device in accordance to the sleep information.

Yet another object of the embodiments herein is to provide a mechanism for broadcasting, by a non-constrained device, an association replacement message to a controller device.

Yet another object of the embodiments herein is to provide a mechanism for receiving, by a non-constrained device, a response to an association replacement message from a controller device.

Yet another object of the embodiments herein is to provide a mechanism for sharing, by a non-constrained device, information about an association with a controller device, wherein the controller device associates with a constrained device in response to receiving a wake-up signal broadcasted by the constrained device in accordance to the sleep information.

Accordingly the embodiments herein provide a method and system for optimizing communication in a heterogeneous network. The method includes forming, by a non-constrained device, an association between the non-constrained device and a constrained device, wherein the association is formed by the non-constrained device in response to receiving an association request broadcasted by the constrained device. Further, the method includes sending, by the non-constrained device, sleep information to the constrained device, wherein the sleep information for the constrained device is computed at the non-constrained device based on at least one parameter associated with the heterogeneous network.

Accordingly the embodiments herein provide a method and system for optimizing communication in a heterogeneous network. The method includes broadcasting, by a constrained device, a message to form an association to a plurality of non-constrained devices in the heterogeneous network. Further, the method includes receiving, by the constrained device, an acknowledge message to form an association from the plurality of non-constrained devices. Further, the method includes computing, by the constrained device, an association weightage for each non-constrained device based on at least one parameter of the non-constrained device. Further, the method includes sending, by the constrained device, an association request to form the association with the non-constrained device from the plurality of non-constrained devices with a highest association weightage. Further, the method includes receiving, by the constrained device, sleep information from the non-constrained device, wherein the sleep information is received at the constrained device in response to forming the association with the non-constrained device.

Accordingly the embodiments herein provide a non-constrained device for optimizing communication in a heterogeneous network. The non-constrained device includes a processor unit configured to form an association with a constrained device, wherein the association is formed by the non-constrained device in response to receiving an association request broadcasted by the constrained device. Further, the processor unit configured to send sleep information to the constrained device, wherein the sleep information for the constrained device is computed at the non-constrained device based on at least one parameter associated with the heterogeneous network.

Accordingly the embodiments herein provide a constrained device for optimizing communication in a heterogeneous network. The constrained device includes a processor unit configured to broadcast a message to form an association to a plurality of non-constrained device in the heterogeneous network. Further, the processor unit configured to receive an acknowledge message to form an association from the plurality of non-constrained devices. Further, the processor unit configured to compute an association weightage for each non-constrained device based on at least one parameter of the non-constrained device. Further, the processor unit configured to send an association request to form the association with the non-constrained device, from the plurality of non-constrained devices, with a highest association weightage. Further, the processor unit configured to receive sleep information from the non-constrained device, wherein the sleep information is received at the constrained device in response to forming the association with the non-constrained device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which:

FIG. 4A illustrates a heartbeat message format sent by the constrained device to the non-constrained device, according to embodiments as disclosed herein;

FIG. 4B illustrates a message format of the non-constrained device or a controller device sent to the constrained device, according to embodiments as disclosed herein;

DETAILED DESCRIPTION

Figure 1A:
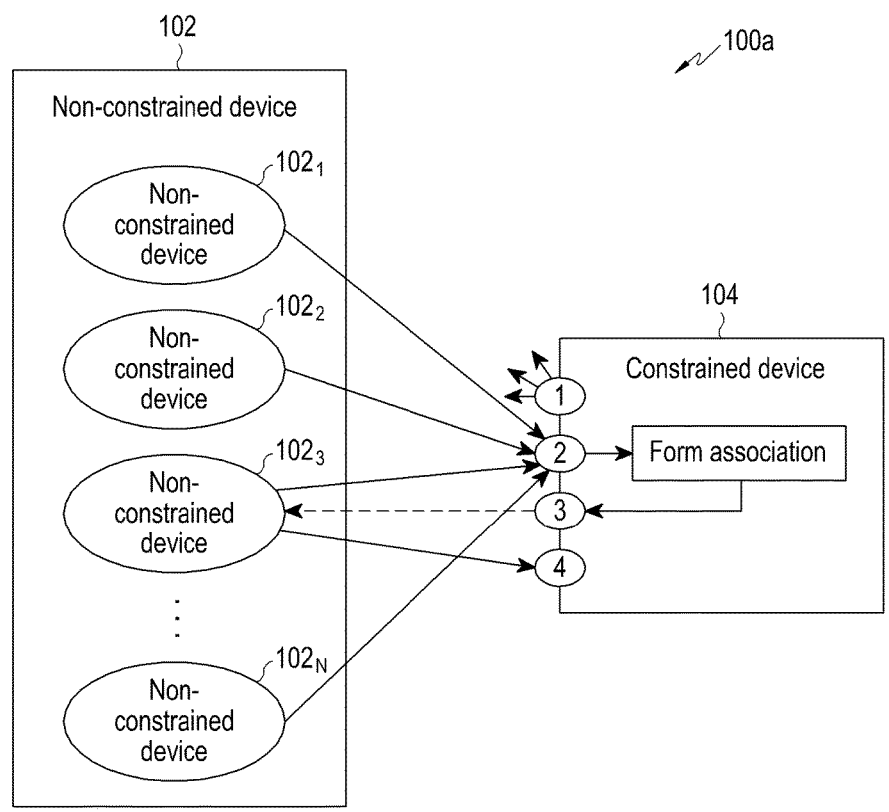
FIG. 1A illustrates generally, among other things, a high level overview of a heterogeneous network for optimizing communication by forming an association between a non-constrained device and a constrained device, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Prior to describing the embodiments in detail, it is useful to provide definitions for key terms and concepts used herein. Unless defined otherwise, all technical and scientific terms used herein have the same meaning as commonly understood by a personnel having ordinary skill in the art to which this invention belongs.

Constrained Device: May, non-exclusively, refers to a resource constrained device having less processing power, limited memory, and speed. These devices are often built using 8-bit microcontrollers or low-cost general purpose 32-bit microcontrollers.

Non-Constrained Device/Controller Device: May, non-exclusively, refers to a device with continuous power supply an entity which can control or monitor the constrained devices or other Non-constrained device(s) using communication functionality.

The embodiments herein achieve a method and system for optimizing communication in a heterogeneous network. The method includes forming, by a non-constrained device, an association between the non-constrained device and a constrained device. The association is formed by the non-constrained device after receiving an association request broadcasted by the constrained device. Further, the method includes sending, by the non-constrained device, sleep information to the constrained device. The sleep information for the constrained device is computed at the non-constrained device based on at least one parameter associated with the heterogeneous network.

In an embodiment, the non-constrained device neither maintains nor acts as a proxy for the constrained device.

In an embodiment, the constrained device sleeps and wakes up based on the sleep information received from the non-constrained device. Further, the non-constrained device dynamically computes and sends the sleep information to the constrained device based on the association when the constrained device wakes up.

In an embodiment, the non-constrained device sends the sleep information using an acknowledgement message, where the sleep information is indicated in a sleep field of the acknowledgement message. The acknowledgement message includes a warning flag field indicating whether any device needs to access the constrained device. Further, the acknowledgement message includes a traffic flag field indicating traffic information of the heterogeneous network.

In an embodiment, the method includes receiving, by the non-constrained device, a request for the sleep information of the constrained device broadcasted by a controller device. Further, the method includes sending, by the non-constrained device, the sleep information of the constrained device to the controller device, where the controller device communicates with the constrained device after receiving a wake-up message broadcasted by the constrained device in accordance to the sleep information.

In an embodiment, the method includes broadcasting, by the non-constrained device, an association replacement message to the controller device. Further, the method includes receiving, by the non-constrained device, a response to the association replacement message from the controller device. Further, the method includes sharing, by the non-constrained device, information about the association with the controller device, where the controller device associates with the constrained device after receiving a wake-up signal broadcasted by the constrained device in accordance to the sleep information.

Another embodiment herein discloses a method for optimizing communication in a heterogeneous network. The method includes broadcasting, by a constrained device, a message to form an association to a plurality of non-constrained devices in the heterogeneous network. Further, the method includes receiving, by the constrained device, an acknowledge message to form an association from the plurality of non-constrained devices. Further, the method includes computing, by the constrained device, an association weightage for each non-constrained device based on at least one parameter of the non-constrained device. Further, the method includes sending, by the constrained device, an association request to form the association with the non-constrained device from the plurality of non-constrained devices with a highest association weightage. Further, the method includes receiving, by the constrained device, sleep information from the non-constrained device, wherein the sleep information is received at the constrained device in response to forming the association with the non-constrained device.

In conventional systems, the constrained devices run all of their services and waits for any external service requests from other external devices such as the non-constrained devices. The constrained devices are forced to keep their radios turned "ON" always to make their presence available for other external devices thus, reducing the battery life of the constrained devices. Further, the constrained devices are forced to retransmit due to congestion in the heterogeneous network. In order to avoid overhead involved in maintaining state, most of the constrained devices operate in a lossy or constrained networks. Also, in order to save life of their batteries most of the constrained devices employ push based mechanism to pull, i.e., the external device (i.e., client) which needs the service is expected to subscribe for the interested service on the constrained device and in turn constrained device will notify upon change in its information back to the client.

In conventional systems, the constrained device is sent to sleep using the non-constrained device. In an example, the constrained device (i.e., battery powered device) is forced to stay active (radio powered on) to receive commands. The greater the period that the constrained device stays active, the battery consumption will be less. Further, the constrained device is forced to stay active primarily to advertise their presence so that the users of the services available on the constrained device can communicate with them.

Unlike conventional systems, the proposed method and system optimizes communication in the heterogeneous network by forming the association between the non-constrained device and the constrained device by broadcasting the association request by the constrained device. Further, the constrained device can be brought to a normal mode from an energy saving mode in case of critical situations or if the controller device needs to directly access the constrained device.

Unlike conventional systems, the proposed method and systems provide an efficient mechanism for exchanging messages amongst the constrained devices which helps in extending the life of the constrained devices (i.e., battery). The constrained device will have longer and discrete sleep times (i.e., the sleep time is defined by the association devices based on various traffic and static parameters) and save more energy. The constrained device need not be active and listening to any requests especially in case of not having subscriptions for their services.

Referring now to the drawings, and more particularly to FIGS. 1 through 15, where similar reference characters denote corresponding features consistently throughout the figures, there are shown preferred embodiments.

FIG. 1A illustrates generally, among other things, a high level overview of a heterogeneous network 100a for optimizing communication by forming an association between a non-constrained device and a constrained device, according to embodiments as disclosed herein. In an embodiment, the heterogeneous network 100a includes a plurality of non-constrained devices $102_{1-N}$ (here after referred as non-constrained device(s) 102) and a constrained device 104 (also referred as controlled device).

The heterogeneous network 100 includes one or more heterogeneous devices deployed to provide various kinds of services. The non-constrained device 102 can be, for example and not limited to, a mobile phone, a smart phone, a Personal Digital Assistant (PDA), a tablet, a phablet, a computer, a refrigerator, a Television (TV), a washing machine, a smart thermostat, a setup Box, or any other electronic device. The constrained device 104 (i.e., Smart Home Protocol (SHP) Lite controlled device) can be, for example and not limited to, a smoke detector, a door lock, a normal thermostat, a humidifier, an Internet Protocol (IP) cam, light bulbs, smart plugs, smart switches, window covering device (i.e., windshields), a smart clock, or the like.

The constrained device 104 may be connected to the Internet, for example the Internet connection may be the Layer 3 connection, while IEEE 802.15.4 connection may be the Layer 2 connection. Further, the non-constrained device 102, perhaps anywhere on the Internet, communicates with the constrained device 104 (e.g., where the constrained device 104 may be asleep when the non-constrained device 102 sends a message to the constrained device 104).

Further, the constrained device 104 includes functionalities or the services which can be controlled through a controller device (not shown). Further, the constrained device 104 has the communication functionality with non-constrained devices 102 or any other devices such as a proxy device. Further, the constrained device 104 doesn't have capability to connect with a server by itself, but it can communicate through the proxy device.

Initially, at step 1, the constrained device 104 broadcasts a message, to form an association, to the plurality of non-constrained devices 102 in the heterogeneous network 100. The message can be a multi-cast message.

At step 2, after receiving the message the plurality of non-constrained devices 102 sends an acknowledgement message to the constrained device 104. The acknowledgement message can be a unicast message. As shown in the FIG. 1A, the non-constrained device $102_1$, the non-constrained device $102_2$, the non-constrained device $102_3$, and the non-constrained device $102_N$ sends the acknowledgement message to the constrained device 104 after receiving the message to form the association.

Further, after receiving the acknowledgement message, the constrained device 104 computes an association weightage for the non-constrained device $102_1$ based on at least one parameter. Further, the constrained device 104 computes the association weightage for the non-constrained device $102_2$ based on at least one parameter. The parameters can be, for example but not limited to network parameters and device parameters. The device parameters can be capability of the device and an availability factor of the device. Further, the constrained device 104 computes the association weightage for the non-constrained device $102_3$ based on at least one parameter. Further, the constrained device 104 computes the association weightage for the non-constrained device $102_N$ based on at least one parameter.

At step 3, the constrained device 104 sends an association request to form the association with the non-constrained device $102_3$ from the plurality of non-constrained devices $102_{1-N}$ with a highest association weightage. After receiving the association request, the non-constrained device $102_3$ accepts the request received from the constrained device 104.

At step 4, the non-constrained device $102_3$ sends sleep information to the constrained device 104 by measuring traffic in the heterogeneous network 100, where the sleep information (i.e., when the constrained device 104 needs to wake-up) is received at the constrained device 104 after forming the association with the non-constrained device $102_3$. Further, the functionalities of the non-constrained device 102 and the constrained device 104 are explained in conjunction with the FIG. 1B.

In an embodiment, the SHP Lite is used by the constrained device 104 in the heterogeneous network 100 for exchanging messages. However, the constrained device 104 spends most of the energy when their Radio (RF) is ON and other services such as a REST service, a Discovery Service, a Network Provision Service, and a Location Service are running.

The FIG. 1A shows a limited overview of the heterogeneous network 100a but, it is to be understood that other embodiments are not limited thereto. Further, the heterogeneous network 100a can include any number of constrained devices and non-constrained devices along with other hardware or software components communicating with each other. For example, the component can be, but not limited to, a process running in the controller or processor, an object, an executable process, a thread of execution, a program, or a computer. By way of illustration, both an application running on a device and the device itself can be a component.

Figure 1B:
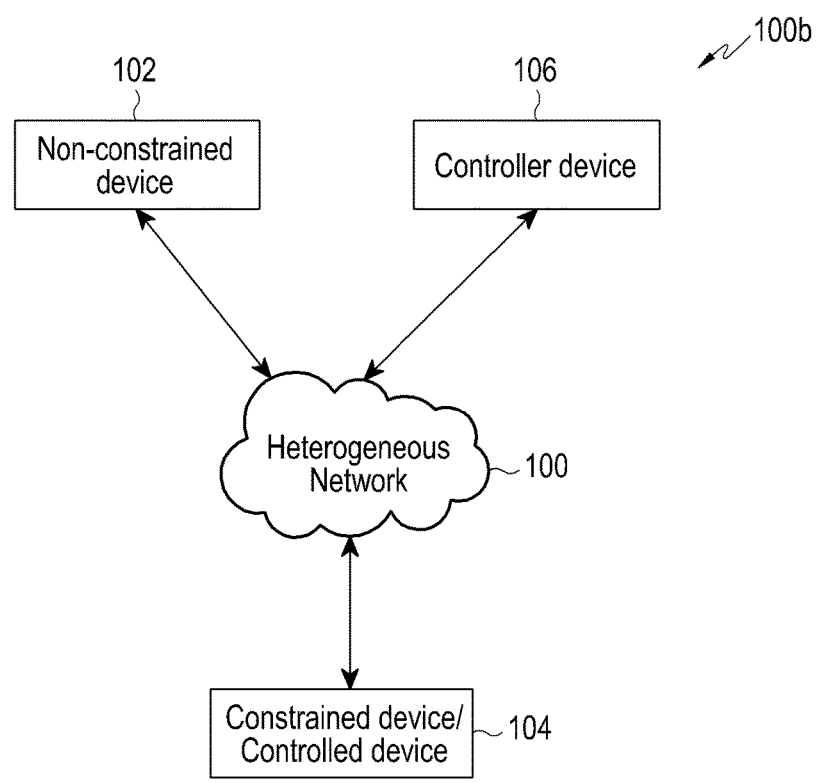
FIG. 1B illustrates another high level overview of a system for sharing information, by the non-constrained device, about association with the constrained device with a controller device, according to embodiments as disclosed herein.

FIG. 1B illustrates another high level overview of a system 100b for sharing information by the non-constrained device 102 about association with the constrained device 104 (also referred as controlled device) with a controller device 106, according to embodiments as disclosed herein. In an embodiment, the system 100b includes the non-constrained device 102, the constrained device 104, the controller device 106, and the heterogeneous network 100.

In an embodiment, the controller device 106 can be a non-constrained device. In an embodiment, the controller device 106 can be configured to broadcast a request for the sleep information of the constrained device 104. As the non-constrained device 102 is associated with the constrained device 104, the non-constrained device 102 receives the broadcasted request. After receiving the broadcasted request, the non-constrained device 102 can be configured to send the sleep information of the constrained device 104 to the controller device 106. Further, the controller device 106 communicates with the constrained device 104 after receiving a wake-up message broadcasted by the constrained device in accordance to the sleep information.

In an embodiment, the non-constrained device 102 can be configured to broadcast an association replacement message to the controller device 106. Further, the non-constrained device 102 can be configured to receive a response to the association replacement message from the controller device 106. Further, the non-constrained device 102 can be configured to share information about the association with the controller device 106. The controller device 106 associates with the constrained device 104 after receiving a wake-up signal broadcasted by the constrained device 104 in accordance to the sleep information.

Further, the controller device 106 re-computes and shares new sleep information for the constrained device 104 based on at least one parameter associated with the heterogeneous network 100. Further, the controller device 106 controls and monitors the constrained device 104 using communication functionality. The controller device 106 can interact with the constrained device 104 directly or through the proxy device. Further, the controller device 106 has the capability to run "Smart Home Application" on its own display. The "Smart Home Application" can either be embedded into the device or it can even be downloaded from application stores. By using the application, users can control or form the association with the constrained device 104 from their controller device 106.

Unlike conventional systems, the constrained device 104 will have longer and discrete sleep times (as sleep information is computed by the non-constrained device 102 based on various traffic and static parameters thereby saving more energy and extending battery life of the constrained device 104. Further, the constrained device 104 doesn't need to be alive and listen to any requests especially in case of not having subscriptions for their services. Further, the constrained device 104 makes use of the traffic slots details for notifications, status updates, or any sort of message communication will drastically reduce the need and overhead involved for re-transmission of the notifications.

The FIG. 1B shows a limited overview of the system 100b but, it is to be understood that other embodiments are not limited thereto. Further, the system 100b can include any number of constrained devices, non-constrained devices, and controller devices along with other hardware or software components communicating with each other. For example, the component can be, but not limited to, a process running in the processor, an object, and an executable process, a thread of execution, a program, or a computer. By way of illustration, both an application running on a device and the device itself can be a component.

Figure 2:
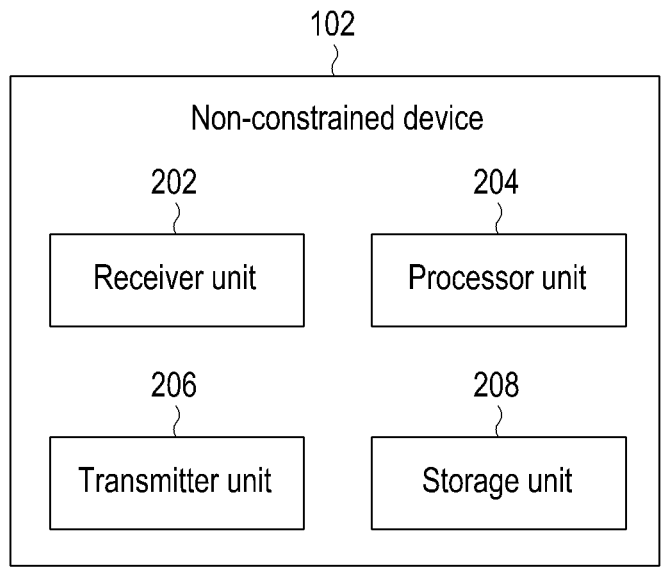
FIG. 2 illustrates various units of a non-constrained device for optimizing communication in the heterogeneous network by forming an association between a non-constrained device and a constrained device, according to embodiments as disclosed herein.

FIG. 2 illustrates various units of the non-constrained device 102 for optimizing communication in the heterogeneous network 100 by forming the association between the non-constrained device 102 and the constrained device 104, according to embodiments as disclosed herein. In an embodiment, the non-constrained device 102 includes a receiver unit 202, a processor unit 204, a transmitter unit 206, and a storage unit 208.

The receiver unit 202 receives the association request broadcasted by the constrained device 104 in the heterogeneous network 100. After receiving the association request, the processor unit 204 can be configured to form the association with the constrained device 104. Further, the processor unit 204 can be configured to send the sleep information to the constrained device 104 using the transmitter unit 206. In an embodiment, the sleep information for the constrained device 104 is computed at processor unit 204 based on the one or more parameters associated with the heterogeneous network 100.

Further, the processor unit 204 neither maintains nor acts as a proxy for the constrained device 104. After receiving the sleep information, the constrained device 104 sleeps and wakes up based on the sleep information. Further, the processor unit 204 dynamically computes and sends the sleep information to the constrained device 104 based on the association when the constrained device 104 wakes up. Further, the processor unit 204 can be configured to send the sleep information using an acknowledgement message. The sleep information is indicated in the sleep field of the acknowledgement message. The acknowledgement message includes the warning flag field indicating whether any device needs to access the constrained device 104. Further, the acknowledgement message includes the traffic flag field indicating the traffic information of the heterogeneous network 100. The format of the acknowledgement message is explained in conjunction with the FIG. 4A.

Further, the processor unit 204 can be configured to receive the request using the receiver unit 202 for the sleep information of the constrained device 104 broadcasted by the controller device 106. Further, the processor unit 204 can be configured to send the sleep information of the constrained device 104 to the controller device 106. The controller device 106 communicates with the constrained device 104 after receiving the wake-up signal message broadcasted by the constrained device 104 in accordance to the sleep information.

Further, the processor unit 204 can be configured to broadcast the association replacement message to the controller device 106. Further, the processor unit 204 can be configured to receive the response to the association replacement message from the controller device 106. Further, the processor unit 204 can be configured to share the information about the association with the controller device 106. The controller device 106 associates with the constrained device 104 after receiving the wake-up signal broadcasted by the constrained device 104 in accordance to the sleep information. The controller device 106 re-computes and shares the new sleep information for the constrained device 104 based on the one or more parameters associated with the heterogeneous network 100.

Further, the storage unit 208 stores the sleep information of the constrained device 104. Further, the storage unit 208 stores the control instructions and operations which are used to perform various operations described herein.

The FIG. 2 shows a limited overview of the non-constrained device 102 but, it is to be understood that other embodiment is not limited thereto. Further, the non-constrained device 102 can include any number of units communicating among each other along with the other components of the heterogeneous network 100.

Figure 3:
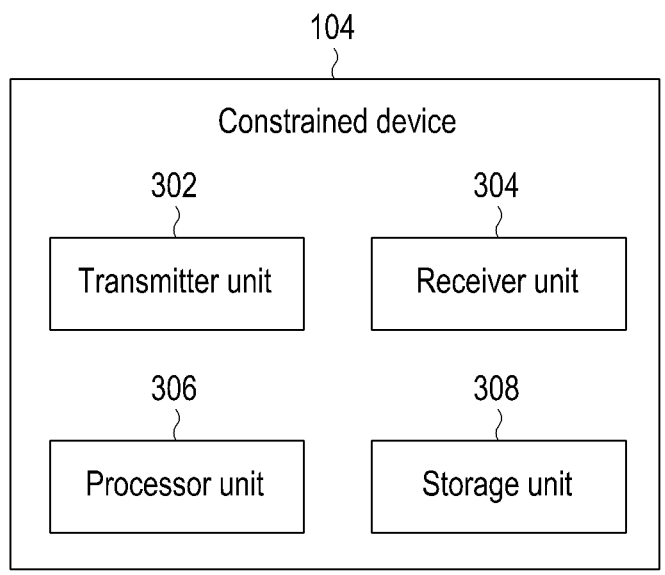
FIG. 3 illustrates various units of a constrained device for optimizing communication in the heterogeneous network by forming an association between a non-constrained device and a constrained device, according to embodiments as disclosed herein.

FIG. 3 illustrates various units of the constrained device 104 for optimizing communication in the heterogeneous network 100 by forming the association between the non-constrained device 102 and the constrained device 104, according to embodiments as disclosed herein. In an embodiment, the constrained device 104 includes a transmitter unit 302, a receiver unit 304, a processor unit 306, and a storage unit 308.

The processor unit 306 can be configured to broadcast a message to form an association to the plurality of non-constrained devices 102 in the heterogeneous network 100 using the transmitter unit 302. Further, the processor unit 306 can be configured to receive the acknowledge message to form the association from the plurality of non-constrained devices 102 using the receiver unit 304. Further, the processor unit 306 can be configured to compute the association weightage for each non-constrained device 102 based on the parameters of the non-constrained device 102. Further, the processor unit 306 can be configured to send the association request from the non-constrained devices 102 to form the association with one of the non-constrained device among the non-constrained devices 102 with the highest association weightage.

Further, the processor unit 306 can be configured to receive the sleep information from the non-constrained device 102. The sleep information is received at the processor unit 306 after forming the association with the non-constrained device 102. Further, the processor unit 306 neither maintains nor acts as the proxy for the constrained device 104. The sleep information for the constrained device 104 is computed at the non-constrained device 102 based on the parameters associated with the heterogeneous network 100. Further, the processor unit 306 can be configured to send the wake-up message to the non-constrained device 102 when the constrained device 104 wakes up in accordance to the sleep information.

In an embodiment, the wake-up message includes a wake-up signal to the non-constrained device 102, and a notification flag indicating whether the constrained device 104 has information to notify in the heterogeneous network 100.

Further, the storage unit 308 stores the sleep information received from the non-constrained device 102. Further, the storage unit 308 stores the control instructions and operations which are used to perform various operations described herein.

The FIG. 3 show a limited overview of the constrained device 104 but, it is to be understood that other embodiment is not limited thereto. Further, the constrained device 104 can include any number of units communicating among each other along with the other components of the heterogeneous network 100.

FIG. 4A illustrates the wake-up message format sent by the constrained device 104 to the non-constrained device 102, according to embodiments as disclosed herein. The wake-up message (i.e., heartbeat message) includes the wake-up signal to the non-constrained device 102, and the notification flag (NFLAG) indicating whether the constrained device 104 has information to notify in the heterogeneous network 100. Further, the wake-up signal is a one bit field and the NFLAG is a one bit field. The NFLAG can take two values "0" or "1". The NFLAG is set to "1" if the constrained device 104 needs to notify the information in the heterogeneous network 100. The NFLAG is set to "0" if no information is to be notified in the heterogeneous network 100. In an example, when the NFLAG is set to "1", then the constrained device 104 waits for the traffic information as the response.

In an example, the wake-up message sent by the constrained device 104 to the non-constrained device 102 can be {WAKEUP_SIGNAL:1, NFLAG:0}. In another example, the wake-up message sent by the constrained device 104 to the non-constrained device 102 can be {WAKEUP_SIGNAL:1, NFLAG: 1}.

FIG. 4B illustrates the message format of the non-constrained device 102 sent to the constrained device 104, according to embodiments as disclosed herein. The acknowledgement message includes the acknowledgement field (ACK), the warning field (WARN), the traffic flag (TFLAG), and the sleep information field (SLEEP). The details of the acknowledgement message is shown below:

ACK: 1 bit field, acknowledgement to the wake-up message

WARN: 3-Bit field, it takes 3 field values, it will be set to '000' by the non-constrained device 102 if the constrained device 104 can be in the sleep mode (i.e., notification only mode), otherwise the constrained device 104 is expected to come out of the sleep mode to the normal mode and enable its services according to the mapped bits as shown below in Table-1:

TABLE 1

| Value | Services |
|---|---|
| 000 | Notification mode |
| 001 | S1 |
| 010 | S1 + S2 |
| 011 | S1 + S2 + S3 |
| 100 | S1 + S2 + S3 + S4 |
| 101 | S1 + S2 + S3 + S4 + S5 |
| 110 | S1 + S2 + S3 + S4 + S5 + S6 |
| 111 | Reserved |

Where the services can be any device specific service which is sequenced as per their need, the services are sequenced as easy setup, discovery, SHP Lite Server service etc. In an embodiment, any number of services will be running by the constrained device 104. For example, the maximum of six different kinds of services will be running by the constrained device 104, if it is running more than 6 services then the field value will be "111" and needs to look in to the service name filled in the optional data field. This information will be provided by the controller device 106 which is looking for the sleeping constrained device 104 in the heterogeneous network 100. If the controller device 106 is unaware of the service details of the constrained device 104 then these bits can be set to "111". If the non-constrained device 102 receives the request for same sleepy constrained device 104 (which is previously associated) from many controllers, it does not need to maintain separate entry for all the controllers, it logically sums up the WARN bit fields and maintain single entry for the constrained device 104.

TFALG: 1-Bit field, it takes two values "0" or "1", will be set to '1', if the traffic information is filled in <optional data>.

SLEEP: The sleep field includes the calculated sleep time (in seconds) for the constrained device 104 by the non-constrained device 102.

<Optional data>: This field contains the predicted network state (i.e., traffic and congestion).

In an example, the non-constrained device 102 acknowledging the wake-up message from the constrained device 104 with the calculated sleep time as "10" seconds is as shown below:

Acknowledgement message={ACK:1, WARN: 000, TFALG: 0, SLEEP: 10}

In another example, the non-constrained device 102 acknowledging the wake-up message with the notification flag set as "1" (NFLAG=1) is as shown below:

Acknowledgement message={ACK:1, WARN: 000, TFALG: 1, SLEEP: 0<Traffic details>}.

In another example, the non-constrained device 102 acknowledging the wake-up message by warning about other devices control request is as shown below:

Acknowledgement message={ACK:1, WARN: 101, TFALG: 0, SLEEP: 10}

Figure 5A:
FIGS. 5A-5C illustrate wake-up sequences of the constrained device, according to embodiments as disclosed herein.
Figure 5B:
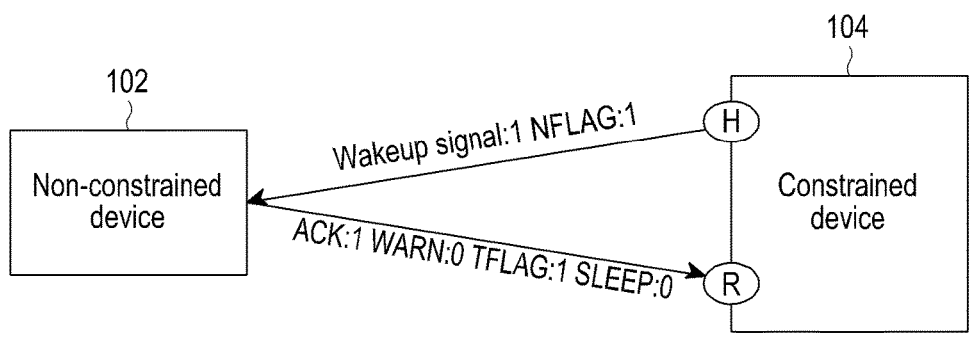
Figure 5C:
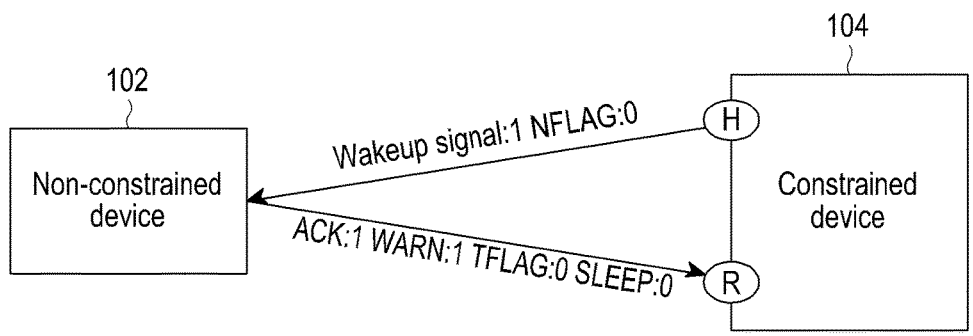

FIGS. 5A-5C illustrate wake-up sequences of the constrained device 104, according to embodiments as disclosed herein. The FIG. 5A shows the normal wake-up procedure of the constrained device 104. The constrained device 104 sends the wake-up message to the non-constrained device 102 as shown below:

Wake-up message={Wake-up signal: 1, NFLAG: 0}

Further, after receiving the wake-up message, the non-constrained device 102 sends the acknowledgement message to the constrained device 104 as shown below:

Acknowledgement message={ACK: 1, WARN: 0, TFALG: 0, SLEEP: 10}

Further, the FIG. 5B shows the wake-up procedure of the constrained device 104 with NFLAG. The constrained device 104 sends the wake-up message to the non-constrained device 102 as shown below:

Wake-up message={Wake-up signal: 1, NFLAG: 1}

Further, after receiving the wake-up message, the non-constrained device 102 sends the acknowledgement message to the constrained device 104 as shown below:

Acknowledgement message={ACK: 1, WARN: 0, TFALG: 1, SLEEP: 0}

Further, the FIG. 5C shows the wake-up procedure of the constrained device 104 with WARN. The constrained device 104 sends the wake-up message to the non-constrained device 102 as shown below:

Wake-up message={Wake-up signal: 1, NFLAG: 0}

Further, after receiving the wake-up message, the non-constrained device 102 sends the acknowledgement message to the constrained device 104 as shown below:

Acknowledgement message={ACK: 1, WARN: 1, TFALG: 1, SLEEP: 0}

Figure 6:
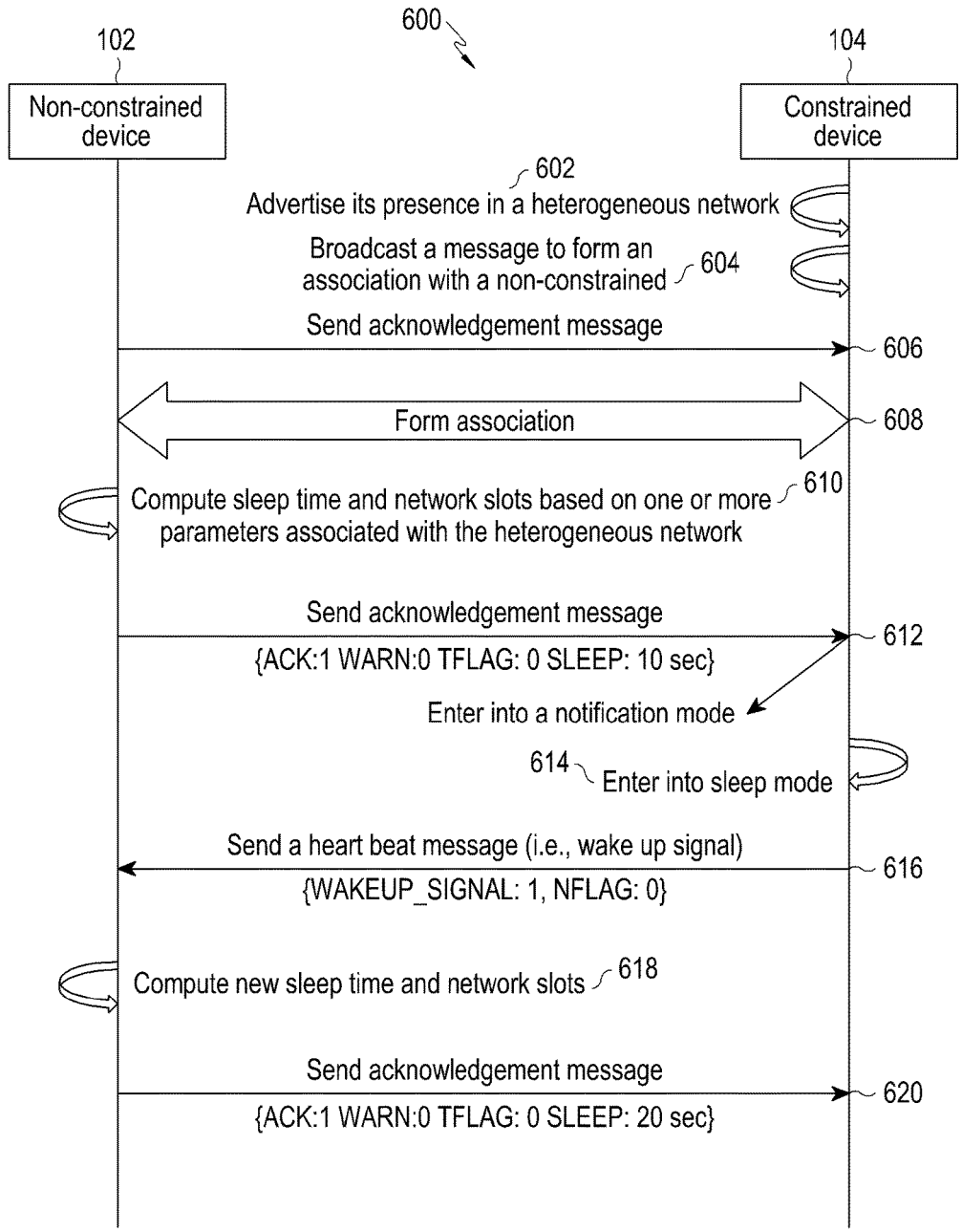
FIG. 6 is a sequence diagram for forming an association between the non-constrained device and the constrained device in the heterogeneous network, according to embodiments as disclosed herein.

FIG. 6 is a sequence diagram 600 for forming the association between the non-constrained device 102 and the constrained device 104 in the heterogeneous network 100, according to embodiments as disclosed herein. In an embodiment, the signaling sequence depicts communications between the non-constrained device 102 and the constrained device 104.

At step 602: The constrained device 104 advertises its presence in the heterogeneous network 100.

At step 604: The constrained device 104 broadcasts the message (i.e., association request) to form the association with the non-constrained device 102 in the heterogeneous network 100.

At step 606: After receiving the association request from the constrained device 104, the non-constrained device 102 sends the acknowledgement message (i.e., response to the association request) to form association.

At step 608: In an embodiment, the non-constrained device 102 forms association with the constrained device 104. In another embodiment, after receiving the acknowledgement message, the constrained device 104 forms the association with the non-constrained device 102.

At step 610: After forming the association between the non-constrained device 102 and the constrained device 104, the non-constrained device 102 computes the sleep time (i.e., sleep information in seconds) and network slots for the constrained device 104 using the one or more parameters associated with the heterogeneous network 100.

At step 612: After computing the sleep time and the network slots, the non-constrained device 102 sends the acknowledgement message to the constrained device 104. After receiving the acknowledgement message, the constrained device 104 enters into the notification only mode. In an embodiment, the acknowledgement message sent to the constrained device 104 is as shown below:

Acknowledgement message={ACK:1, WARN:0, TFLAG: 0, SLEEP: 10 sec}

At step 614: After receiving the acknowledgement message including the sleep time, the constrained device 104 enters into the sleep mode. In an example, the constrained device 104 enters into the sleep mode and will sleep for 10 sec as indicated in the sleep field of the acknowledgement message.

At step 616: The constrained device 104 sends the wake-up message (i.e., heartbeat message) to the non-constrained device 102 when the constrained device 104 wakes up in accordance to the sleep information. The wake-up message includes the wake-up signal to the non-constrained device 102, and the notification flag indicating whether the constrained device 104 has information to notify in the heterogeneous network 100. In an embodiment, the wake-up message sent to the non-constrained device 102 can be as shown below:

Wake-up message={WAKEUP_SIGNAL: 1, NFLAG: 0}

At step 618: After receiving the wake-up message, the non-constrained device 102 computes the new sleep time and the network slots based on the parameters associated with the heterogeneous network 100.

At step 620: The non-constrained device 102 sends the acknowledgement message including the newly computed sleep time and the network slots to the constrained device 104. In an embodiment, the acknowledgement message sent to the constrained device 104 is as shown below:

Acknowledgement message={ACK:1, WARN:0, TFLAG: 0, SLEEP: 20 sec}

Figure 7:
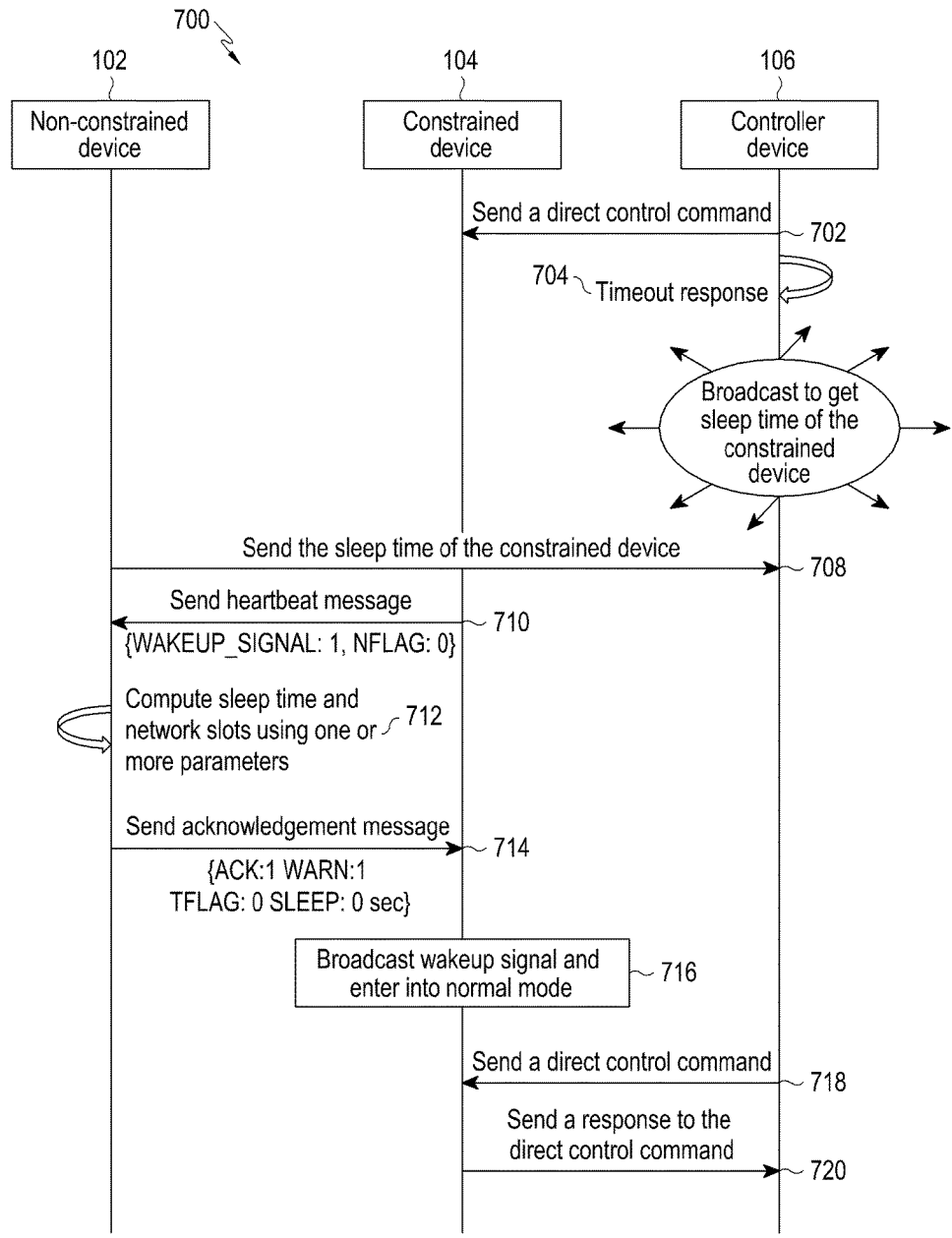
FIG. 7 is a sequence diagram for sharing information about the association between the non-constrained device and the constrained device with the controller device, according to embodiments as disclosed herein.

FIG. 7 is a sequence diagram 700 for sharing information about the association between the non-constrained device 102 and the constrained device 104 with the controller device 106, according to embodiments as disclosed herein. In an embodiment, the signaling sequence depicts communications between the non-constrained device 102, the constrained device 104, and the controller device 106.

At step 702: The controller device 106 sends a direct control command to the constrained device 104 to seek the service of the constrained device 104.

At step 704: The controller device 106 receives a timeout response as the constrained device 104 is not associated with the controller device 106.

At step 706: The controller device 106 broadcasts the message to receive the sleep time of the constrained device 104.

At step 708: After receiving the message broadcasted by the controller device 106, the non-constrained device 102 sends the sleep information of the constrained device 104 to the controller device 106. In an example, the non-constrained device 102 sends the wake-up time of the constrained device 104 (for about 10 sec) to the controller device 106.

At step 710: The constrained device 104 sends the wake-up message to the non-constrained device 102. In an embodiment, the wake-up message sent to the non-constrained device 102 can be as shown below:
Wake-up message={WAKEUP_SIGNAL: 1, NFLAG: 0}

At step 712: The non-constrained device 102 computes the sleep time and the network slots for the constrained device 104 using the parameters associated with the heterogeneous network 100.

At step 714: After computing the sleep time and the network slots, the non-constrained device 102 sends the acknowledgement message to the constrained device 104. In an embodiment, the acknowledgement message sent to the constrained device 104 is as shown below:
Acknowledgement message={ACK:1, WARN: 1, TFLAG: 0, SLEEP: 0 sec}

At step 716: After receiving the acknowledgement message, the constrained device 104 broadcasts the wake-up signal and enters into the normal mode by activating a server.

At step 718: The controller device 106 sends a direct control command to associate with the constrained device 104 after receiving the wake-up signal broadcasted by the constrained device 104 in accordance to the sleep time.

At step 720: After receiving the direct control command, the constrained device 104 sends a response to the direct control command.

Figure 8:
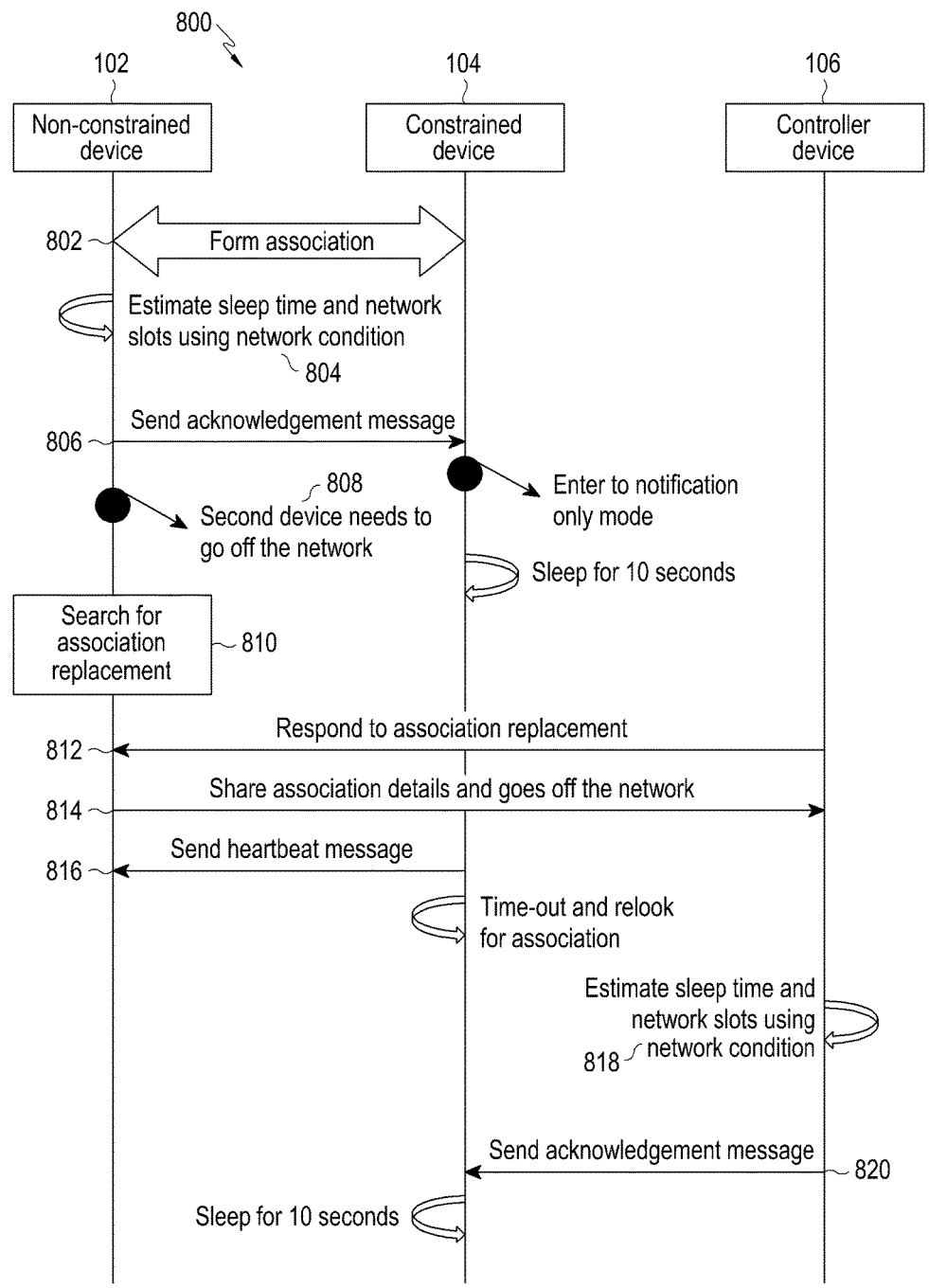
FIG. 8 is a sequence diagram for sharing the information about the association by the non-constrained device with the controller device, according to embodiments as disclosed herein.

FIG. 8 is a sequence diagram 800 for sharing the information about the association by the non-constrained device 102 with the controller device 106, according to embodiments as disclosed herein. In an embodiment, the signaling sequence depicts communications between the non-constrained device 102, the constrained device 104, and the controller device 106.

At step 802: The non-constrained device 102 forms association with the constrained device 104.

At step 804: After the association between the non-constrained device 102 and the constrained device 104, the non-constrained device 102 computes the sleep time and the network slots for the constrained device 104 using the parameters associated with the heterogeneous network 100.

At step 806: After computing the sleep time and the network slots, the non-constrained device 102 sends the acknowledgement message to the constrained device 104. After receiving the acknowledgement message, the constrained device 104 enters into the notification only mode and further enters into the sleep mode. In an embodiment, the acknowledgement message sent to the constrained device 104 is as shown below:
Acknowledgement message={ACK:1, WARN:0, TFLAG: 0, SLEEP: 10 sec}

At step 808: The non-constrained device 102 needs to go off the heterogeneous network 100, where the constrained device 104 sleeps for 10 sec as per the sleep time indicated in the acknowledgement message.

At step 810: The non-constrained device 102 searches for one or more devices for the association replacement by broadcasting the association replacement message.

At step 812: After receiving the association replacement message, the controller device 106 sends the response to the non-constrained device 102.

At step 814: After receiving the response, the non-constrained device 102 shares the information about the association details with the controller device 106.

At step 816: The constrained device 104 sends the wake-up message to the non-constrained device 102. Further, the constrained device 104 receives a time out message and relooks for the association. In an embodiment, the wake-up message sent to the non-constrained device 102 can be as shown below:
Wake-up message={WAKEUP_SIGNAL: 1, NFLAG: 0}

At step 818: After receiving the association message, the controller device 106 computes the sleep time and the network slots for the constrained device 104 using the parameters associated with the heterogeneous network 100.

At step 820: After computing the sleep time and the network slots, the controller device 106 sends the acknowledgement message to the constrained device 104. In an embodiment, the acknowledgement message sent to the constrained device 104 is as shown below:
Acknowledgement message={ACK:1, WARN: 0, TFLAG: 0, SLEEP: 10 sec}

Further, after receiving the acknowledgement message, the constrained device 104 enters into the sleep mode and sleeps for 10 sec.

Figure 9:
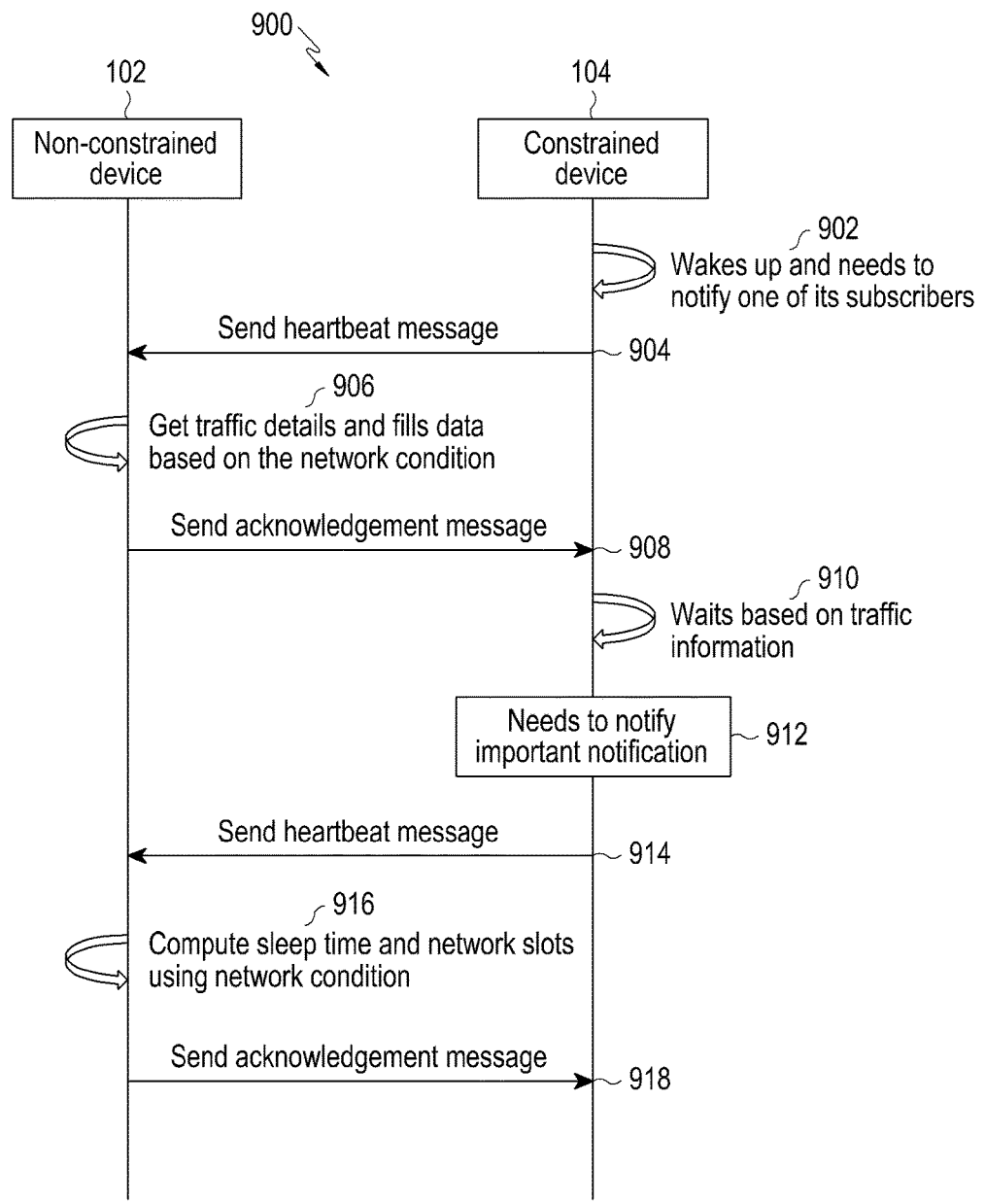
FIG. 9 is a sequence diagram for utilizing best traffic slots to send information from the constrained device to the non-constrained device, according to embodiments as disclosed herein.

FIG. 9 is a sequence diagram 900 for utilizing best traffic slots to send information from the constrained device 104 to the non-constrained device 102, according to embodiments as disclosed herein. In an embodiment, the signaling sequence depicts communications between the non-constrained device 102 and the constrained device 104.

At step 902: The constrained device 104 wakes up and needs to notify one of its subscribers.

At step 904: The constrained device 104 sends the wake-up message to the non-constrained device 102. In an embodiment, the wake-up message sent to the non-constrained device 102 can be as shown below:
Wake-up message={WAKEUP_SIGNAL: 1, NFLAG: 1}

At step 906: After receiving the wake-up message, the non-constrained device 102 computes the traffic information and fills the data based on the condition of the heterogeneous network 100.

At step 908: After computing the traffic information, the non-constrained device 102 sends the acknowledgement message to the constrained device 104. In an embodiment, the acknowledgement message sent to the constrained device 104 is as shown below:
Acknowledgement message={ACK:1, WARN: 0, TFLAG: 1, SLEEP: 0<Traffic information>}

At step 910: After receiving the acknowledgement message, the constrained device 104 waits based on the traffic information.

At step 912: The constrained device 104 needs to notify important notification.

At step 914: The constrained device 104 sends the wake-up message to the non-constrained device 102. In an embodiment, the wake-up message sent to the non-constrained device 102 can be as shown below:
Wake-up message={WAKEUP_SIGNAL: 1, NFLAG: 0}

At step 916: The non-constrained device 102 computes the sleep time and the network slots for the constrained device 104 using the parameters associated with the heterogeneous network 100.

At step 918: After computing the sleep time and the network slots, the non-constrained device 102 sends the acknowledgement message to the constrained device 104. In an embodiment, the acknowledgement message sent to the constrained device 104 is as shown below:
Acknowledgement message={ACK:1, WARN:0, TFLAG: 0, SLEEP: 10 sec}

Figure 10:
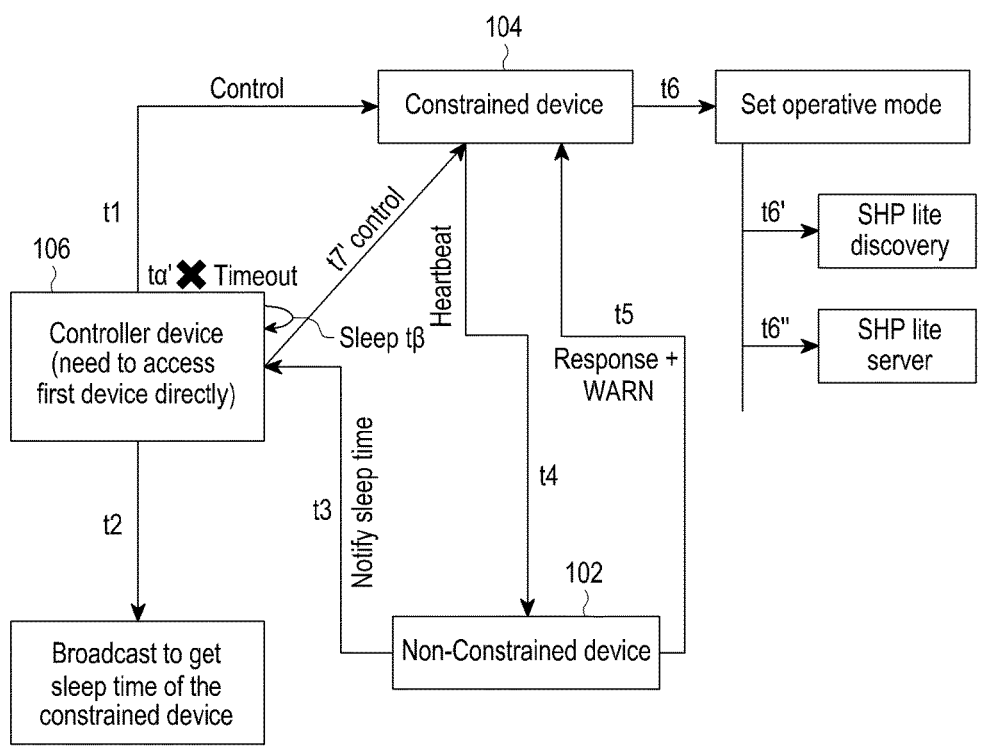
FIG. 10 illustrates a system for providing access to sleepy devices for the controller device, according to embodiments as disclosed herein.

FIG. 10 illustrates a system 1000 for providing access to sleepy devices for the controller device, according to embodiments as disclosed herein. The constrained device 104 is in a deep sleep mode and other devices (i.e., the controller type of devices) like to control the constrained device 104 directly. Further, when other devices needs to access the constrained device 104 which is currently in the sleep mode then, the below mentioned timing sequence is to be followed as mentioned below as shown in the FIG. 10:

Timing Sequence (t1): The controller device 106 sends a control request to the constrained device 104, eventually (after tαtime) the control request fails as the constrained device 104 is in the sleep mode. Further, the controller device 106 may try all its retrials and will declare it as failed, then proceeds to next step.

Timing Sequence (t2): As the control request is failed, the controller device 106 sends the broadcast request in the heterogeneous network 100 to identify the wake-up time of the constrained device 104.

Timing Sequence (t3): The non-constrained device 102 (which is associated with the constrained device 104) receives the broadcast request. After receiving the broadcast request, the non-constrained device 102 responds with the sleep information (i.e., remaining sleep time or the number of seconds by which the constrained device 104 is expected to wake-up) of the constrained device 104.

Timing Sequence (t4): At the end of sleep time, the constrained device 104 wakes up and send the wake-up message to the non-constrained device 102.

Timing Sequence (t5): After receiving the wake-up message from the constrained device 104, the non-constrained device 102 identifies that the controller device 106 needs to directly access the constrained device 104. Further, the non-constrained device 102 fills the WARN field based on the information obtained from the controller device 106. However, if there are many controller devices requesting for the constrained device 104 then, all the service information will be logically summed up and maintained as one WARN field and sends the acknowledgement message.

Timing Sequence (t6): The constrained device 104 enables the service based on the bit values set in the WARN field.

Timing Sequence (t7): As the constrained device 104 enters into the normal mode by enabling the required services, the controller device 106 can directly access or control the constrained device 104 after specified (tβ) sleep time.

Figure 11:
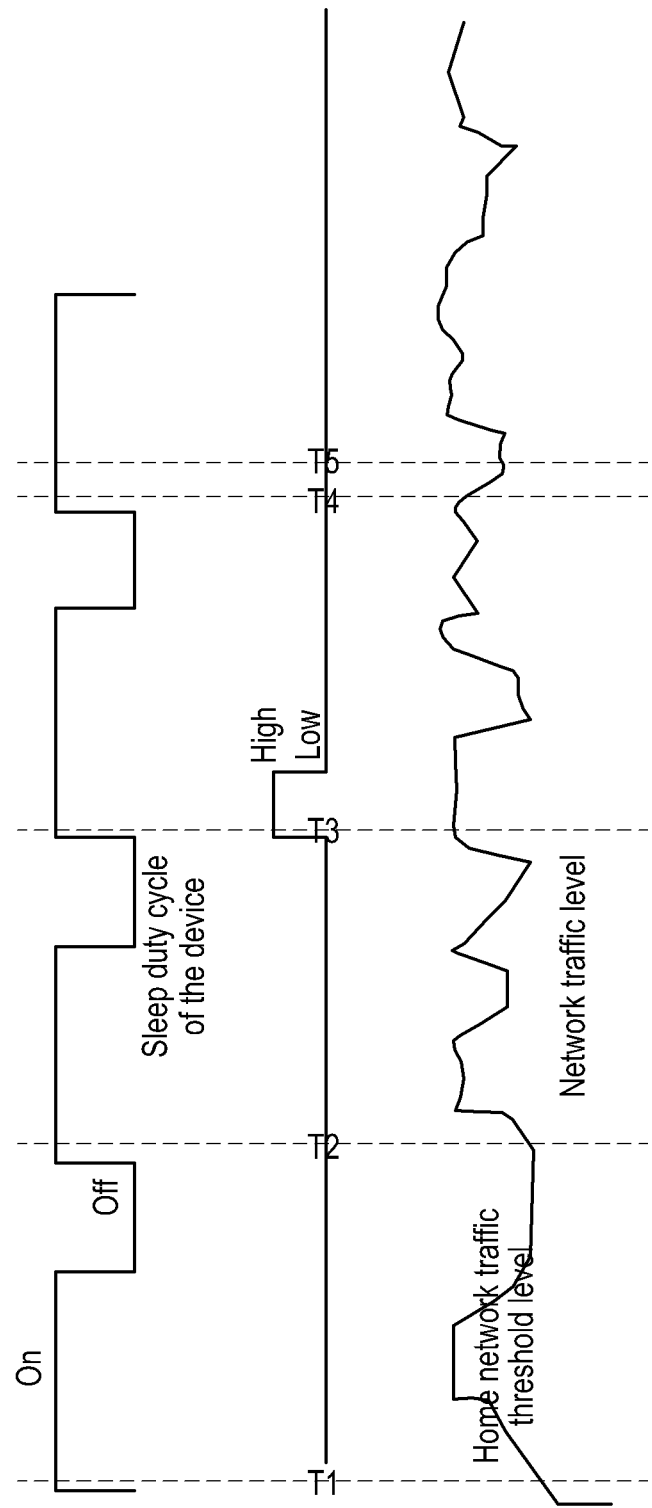
FIG. 11 illustrates a waveform for selecting an optimum time to send the notification to avoid re-transmission when the heterogeneous network is congested, according to embodiments as disclosed herein.

FIG. 11 illustrates a waveform for selecting an optimum time to send the notification to avoid re-transmission when the heterogeneous network 100 is congested, according to embodiments as disclosed herein. As shown in the FIG. 11, the constrained device 104 can use the network traffic details (slots) provided by the non-constrained device 102 as response to the wake-up message and notify (or any message like Heartbeat message or Information to the association devices or reaching controller devices directly) with less number of retransmissions.

Further, after receiving the wake-up message during the association, the non-constrained device 102 provides $T_{Sc}$ (Traffic slots) as the response to the JOIN request. After the constrained device 104 receives the sleep time and the traffic slots, the below method describes how to avoid the re-transmission during sending the notification. Below timing sequences are used with reference to the FIG. 11.

At T1 and T2, the constrained device 104 has information to notify, as the traffic level is low, the constrained device 104 notifies immediately. (This traffic details are provided in the $T_{Sc}$).

At T3, the constrained device 104 has critical information to be notified, though the traffic level is high, the constrained device 104 notifies immediately as the information is very critical.

At T4, the constrained device 104 has normal information to be notified, and the traffic level is high, so it waits till the traffic gets subsidized, and notifies at time T5 where the traffic level comes down.

Unlike conventional systems, the above described approach avoids the re-transmission by the constrained device 104 during notification(s). Further, the constrained device 104 receives the network predicated traffic slots as a response to its notification data sent along with the acknowledgment message from the association device (assumed that associated device can get current network details by any means and can predict the network level for some duration).

Figure 12:
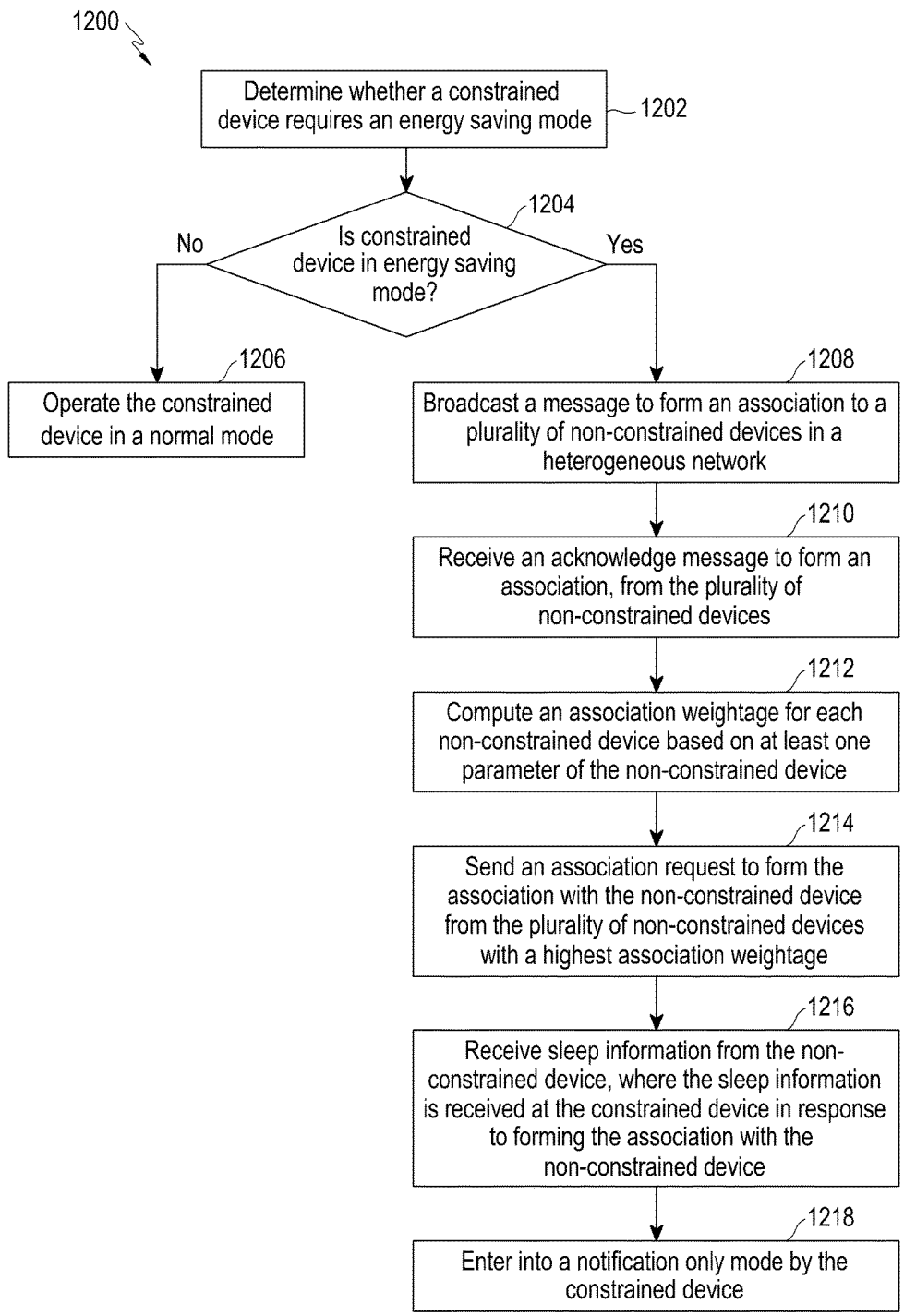
FIG. 12 is another flow diagram illustrating a method for associating the non-constrained device with the constrained device, according to embodiments as disclosed herein.

FIG. 12 is another flow diagram illustrating a method 1200 for associating the non-constrained device 102 with the constrained device 104, according to embodiments as disclosed herein. At step 1202, the method 1200 includes determining whether the constrained device 104 requires an energy saving mode. If it is determined, at step 1204, that the constrained device 104 is not in the energy saving mode then, at step 1206, the method 1200 includes operating the constrained device 104 in the normal mode.

If it is determined, at step 1204, that the constrained device 102 is in the energy saving mode then, at step 1208, the method 1200 includes broadcasting the message to form the association to the plurality of non-constrained devices 102 in the heterogeneous network 100. At step 1210, the method 1200 includes receiving the acknowledgement message to from the association from the plurality of non-constrained devices 102.

At step 1212, the method 1200 includes computing the association weightage for each non-constrained device 102 based on at least one parameter of the non-constrained device 102. The method 1200 allows the constrained device 104 to compute the association weightage for each non-constrained device 102 based on the parameters of the non-constrained device 102. At step 1214, the method 1200 includes sending the association request to form the association with the non-constrained device 102 from the plurality of non-constrained devices 102 with the highest association weightage. The method 1200 allows the constrained device 102 to send the association request to form the association with the non-constrained device 102 from the plurality of non-constrained devices 102 with the highest association weightage.

In an embodiment, whenever the constrained device 104 is newly added to the heterogeneous network 100 or it had lost connection with pre-associated device, the constrained device 104 looks for the proxy device. Upon presence of the proxy device, the constrained device 104 goes to the proxy mode, and upon not finding the proxy device, the constrained device 104 sends the multicast search request for the association device. The association device is the non-constrained device 102 which is capable of getting traffic information and is able to estimate the sleep time for the constrained device 104. The criterion for any device to associate a constrained device 104 follows the below described procedure:

- It shall be the non-constrained device 104.
  - Expected to have sufficient memory or processing power.
- It shall always be available in the heterogeneous network 100.
  - In case it needs to go off the heterogeneous network 100 then, before leaving the heterogeneous network 100 it is expected to share the constrained device 104 details to other capable device (i.e., can be any other non-constrained device 102 or the controller device 106).
- Shall be in a position to gauge traffic and congestion present in the heterogeneous network 100.
  - Shall make use of the traffic parameters and compute the sleep time for the constrained device 104.
  - Shall allow the constrained device 104 to have deep sleep mode (i.e., move into notification only mode)
- If required, the non-constrained device 102 shall broadcast the sleep time of the constrained device 104 to other devices looking for the constrained device 104, and shall respond to the broadcast requests from controller device 106 on behalf of the constrained device 104.
  - Shall store the requests of the controller device 106 and bring (through 'WARN' field) the constrained device 104 back to the normal mode.

Further, the association devices (i.e., plurality of non-constrained devices 102) which receive the multicast search request from the constrained device 104 looking for the association, shall acknowledge with their interest to associate and along with required information to the constrained device 104 as the unicast response. After receiving acknowledgements from the plurality of non-constrained devices 102 for the association request, the constrained device 104 makes use of the below mentioned equations to select the best non-constrained device 102 as the association device.

$$AW_i = \sum_{i=0}^{n} ASD_{rss(i)} + T_{avail(i)} + P_{ID(i)} + ASD_{xy(i)} + R_{avail(i)}$$

Where, i is the information from $i^{th}$ device, $ASD_{rss}$ is the RSSI received adding with +85 numerical value, $T_{avail}$ is the total time available in a day, PID is the number of parent devices it's connected to join the network till home access point, and $ASD_{xy}$ is location related parameter, the parameter is based on the location; if the location contains more mobile devices then it's rated less. It's assumed that the non-constrained device 102 have the information.

Further, the $T_{avail}$, the PID, the $ASD_{xy}$, and the $R_{avail}$ values are sent by the non-constrained device 102 as the response to the multicast request made by the constrained device 104. The best non-constrained device 102 will be selected by selecting the device which has maximum association weightage (AW).

Best Association device=max$\{AW_i\}$

Where, i=1 to n, and n is the number of non-constrained devices 102 responded for the constrained device 104 broadcast request.

At step 1216, the method 1200 includes receiving sleep information from the non-constrained device 102, where the sleep information is received at the constrained device 104 after forming the association with the non-constrained device 102. The method 1200 allows the constrained device 104 to receive the sleep information from the non-constrained device 102, where the sleep information is received at the constrained device 104 after forming the association with the non-constrained device 102. At step 1218, the method 1200 includes entering into the notification only mode by the constrained device 104. The method 1200 allows the constrained device 104 to enter into the notification only mode.

The various actions, acts, blocks, steps, and the like in method 1200 may be performed in the order presented, in a different order or simultaneously. Further, in some embodiments, some actions, acts, blocks, steps, and the like may be omitted, added, modified, skipped, and the like without departing from scope of the invention.

Figure 13:
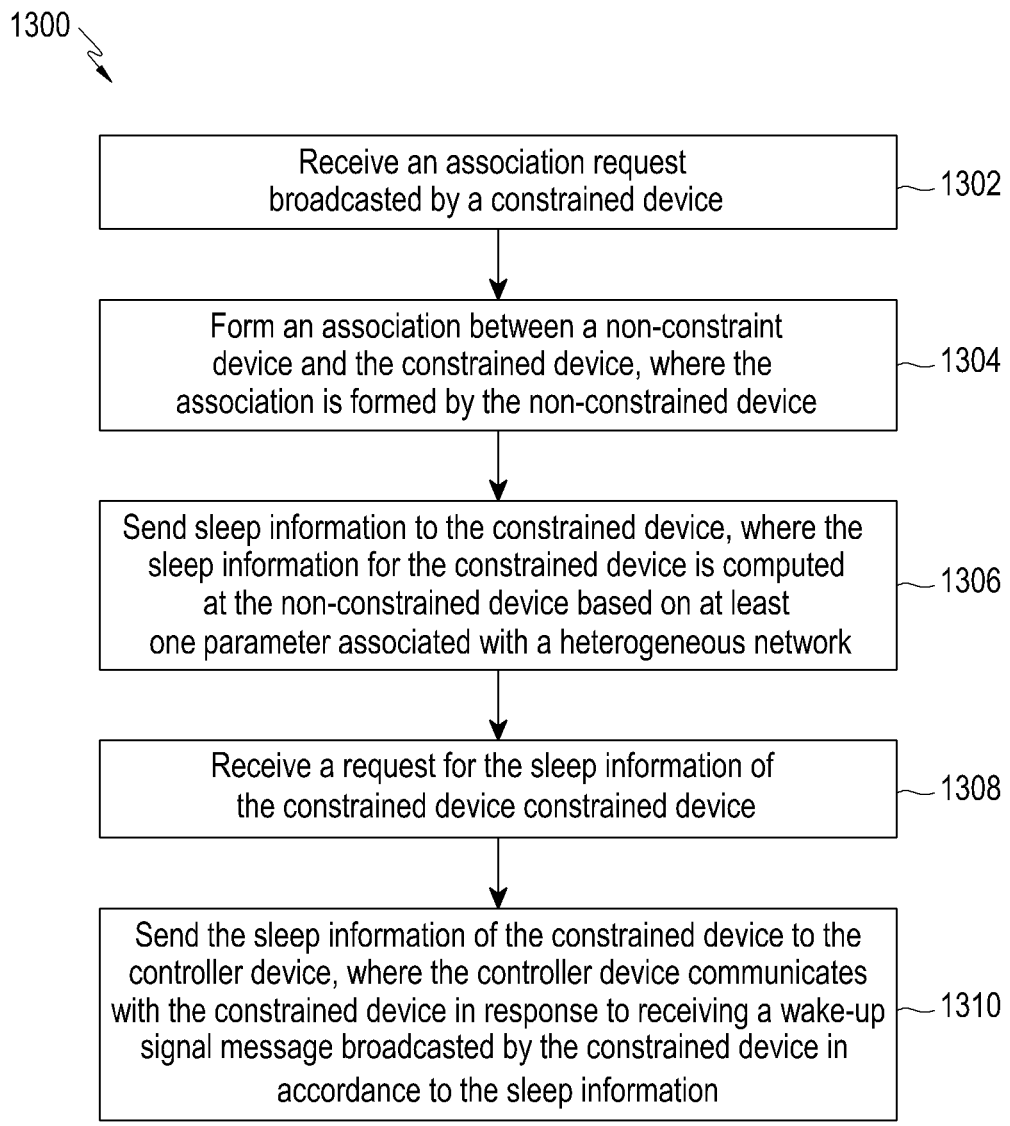
FIG. 13 is a flow diagram illustrating a method for sharing information about association between the non-constrained device and the constrained device with a controller device, according to embodiments as disclosed herein.

FIG. 13 is a flow diagram illustrating a method 1300 for sharing information about the association between the non-constrained device 102 and the constrained device 104 with the controller device 106, according to embodiments as disclosed herein. At step 1302, the method 1300 includes receiving the association request broadcasted by the constrained device 104. The method 1300 allows the non-constrained device 102 to receive the association request broadcasted by the constrained device 104.

At step 1304, the method 1300 includes forming the association between the non-constrained device 102 and the constrained device 104. The method 1300 allows the non-constrained device 102 to form the association with the constrained device 104.

At step 1306, the method 1300 includes sending the sleep information to the constrained device 104. The method 1300 allows the non-constrained device 102 to send the sleep information to the constrained device 104. The sleep information for the constrained device 104 is computed at the non-constrained device 102 based on the parameters associated with the heterogeneous network 100.

In an embodiment, the sleep time of the constrained device 104 can be computed based on the type of the non-constrained device 102 and location. The application load at $j^{th}$ device for the time duration current time 'ct' to future time 'ct+t' is obtained using the following equation as shown below:

$$DCL_{ij} = \Sigma_{t=ct}^{ct+t} \Sigma_{i=0}^{n} TP_{ij} * T_t$$

Where n is number of applications running on the $j^{th}$ device and $TP_{ij}$ is type of the $i^{th}$ application running on the $j^{th}$ device.

Further, the application load at all selected devices for the time duration of the current time 'ct' to the future time 'ct+t' can be calculated as shown below:

$$NCL_t = \sum_{t=ct}^{ct+t} \sum_{j=0}^{d} \sum_{i=0}^{n} TP_{ij} * T_t$$

where, $T_t$ is the time duration till the traffic load has to be estimated and "D" is the number of devices selected for logging the network information.

Further, as traffic in a home mainly depends on the number of devices running and the kind of application running on the devices, above two equations provides best estimation of the traffic load for the certain duration of time, parameters $NCL_t$ and $DCL_{ij}$ will be used in the solution to obtain best traffic slots for the constrained device 104 to communicate. The below described process of the proposed method determines the traffic behavior for the given duration for the constrained device 104 which needs to make use of best traffic slots to send the notification or the wake-up message.

$CON_d$=Constrained device 'd' needs the management operation $TT_d$=Time duration till the traffic behavior is to be estimated.

$\Psi$=Pre-determined performance $TT_d=TCON_d*\Psi$ in seconds;

'$TCON_d$'=Is the type of the device "d"

$T_{Sc}$=valid time slots counter for the constrained device 'd'

Let d=constrained device which needs best traffic slots

'ct'=is the current time and 't'=time duration till best traffic slots to be estimated.

FOR t=ct to ct+t
IF ($NCL_{(t)}<(DCL_{d(t)}+TT_d)$ AND $TT_d>0$)) THEN
Save valid traffic slot $TS_c$
ENDFOR After these steps, the $TS_c$ will have the number of best traffic slots that can be used by the constrained device 104, the slots will be filled in the optional field of the acknowledgement message. The sleep time '$S_t$' will be calculated based on the traffic free time and will be filled in the acknowledgement message. Below method will determine the best sleep time for the constrained device 104.

IF (($TH_j<\alpha_j*N_{th}$) && ($A_{TT}<N_{tt}$)) THEN
$S_t$=CT;
ELSE IF (($TH_j>\alpha_j*N_{th}$) && ($A_{TT}<N_{tt}$)) THEN
$S_t$=min of $\{DCL_{jt}\}$;
ELSE IF ($ATH<\beta_j*N_{th}$) && ($ATT<N^{tt}$)) THEN
$S_t$=min of $\{NCL_t\}$;
ELSE;
ENDFOR Further, j is the device number of the constrained device 104 which is requested for the association, $N_{th}$ is the nominal throughput at home, $N_{tt}$ is the nominal trip time, and these two are empirically obtained for the typical home network with allowed traffic. $\alpha$ and $\beta$ are the constants used as threshold values to find out the maximum load that can be handled by the network for the current management operation, $TH_j$ is the through put at $j_{th}$ device. This filled acknowledgement message will be used to send as the response for accepting the JOIN request or response to the wake-up message sent by the constrained device 104 to indicate its presence.

At step 1308, the method 1300 includes receiving the request for the sleep information of the constrained device 104 broadcasted by the controller device 106. The method 1300 allows the non-constrained device 102 to receive the request for the sleep information of the constrained device 104 broadcasted by the controller device 106.

At step 1310, the method 1300 includes sending the sleep information of the constrained device 104 to the controller device 106. The method 1300 allows the non-constrained device 102 to send the sleep information of the constrained device 104 to the controller device 106. The controller device 106 communicates with the constrained device 104 after receiving the wake-up signal message broadcasted by the constrained device 104 in accordance to the sleep information.

The various actions, acts, blocks, steps, and the like in method 1300 may be performed in the order presented, in a different order or simultaneously. Further, in some embodiments, some actions, acts, blocks, steps, and the like may be omitted, added, modified, skipped, and the like without departing from scope of the invention.

Figure 14:
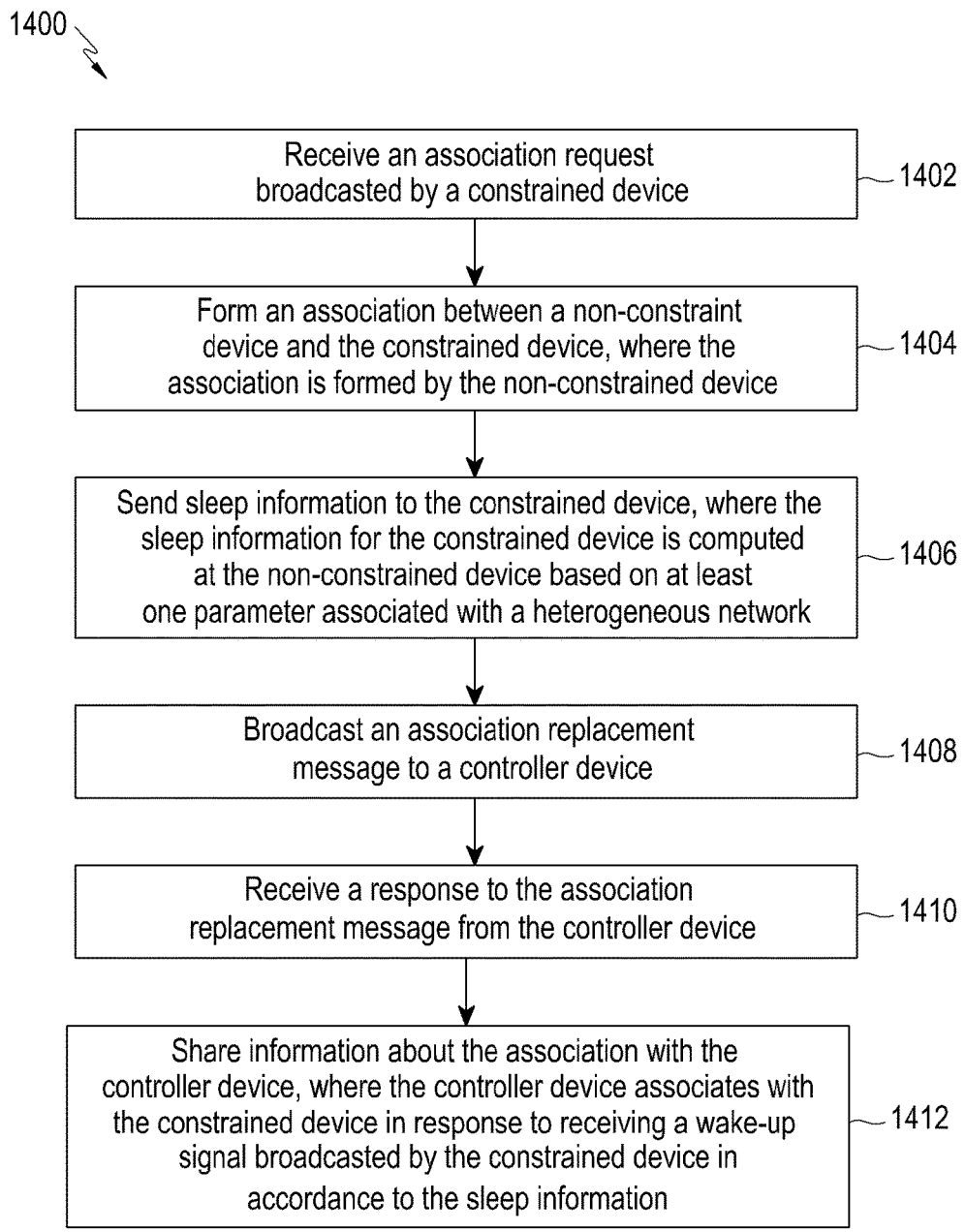
FIG. 14 is a flow diagram illustrating a method for sharing information about association between the non-constrained device and the constrained device with the controller device, according to embodiments as disclosed herein.

FIG. 14 is a flow diagram illustrating a method 1400 for sharing information about association between the non-constrained device 102 and the constrained device 104 with the controller device 106, according to embodiments as disclosed herein. The steps 1402 to 1406 are explained in conjunction with steps 1302 to 1306 of the FIG. 13.

At step 1408, the method 1400 includes broadcasting the association replacement message to the controller device 106. The method 1400 allows the non-constrained device 104 to broadcast the association replacement message to the controller device 106. At step 1410, the method 1400 includes receiving the response to the association replacement message from the controller device 106. The method 1400 allows the non-constrained device 102 to receive the response to the association replacement message from the controller device 106.

At step 1412, the method 1400 includes sharing information about the association with the controller device 106, where the controller device 106 associates with the constrained device 104 in response to receiving the wake-up signal broadcasted by the constrained device 104 in accordance to the sleep information. The method 1400 allows the non-constrained device 102 to share information about the association with the controller device 106, where the controller device 106 associates with the constrained device 104 in response to receiving the wake-up signal broadcasted by the constrained device 104 in accordance to the sleep information.

The various actions, acts, blocks, steps, and the like in method 1400 may be performed in the order presented, in a different order or simultaneously. Further, in some embodiments, some actions, acts, blocks, steps, and the like may be omitted, added, modified, skipped, and the like without departing from scope of the invention.

Figure 15:
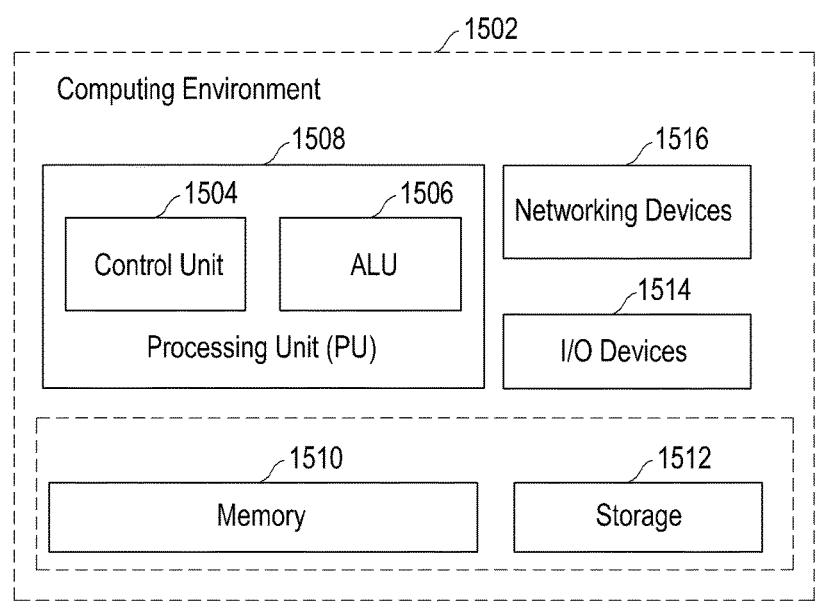
FIG. 15 illustrates a computing environment implementing the method and system for optimizing communication in the heterogeneous network by forming an association between a non-constrained device and a constrained device, according to embodiments as disclosed herein.

FIG. 15 illustrates a computing environment implementing the method and system for optimizing communication in the heterogeneous network by forming an association between the non-constrained device and the constrained device, according to embodiments as disclosed herein. As depicted in the figure, the computing environment 1502 comprises at least one processing unit 1508 that is equipped with a control unit 1504 and an Arithmetic Logic Unit (ALU) 1506, a memory 1510, a storage unit 1512, plurality of networking devices 1516, and a plurality Input output (I/O) devices 1514. The processing unit 1508 is responsible for processing the instructions of the algorithm. The processing unit 1508 receives commands from the control unit in order to perform its processing. Further, any logical and arithmetic operations involved in the execution of the instructions are computed with the help of the ALU 1506.

The overall computing environment 1502 can be composed of multiple homogeneous and/or heterogeneous cores, multiple CPUs of different kinds, special media and other accelerators. The processing unit 1508 is responsible for processing the instructions of the algorithm. Further, the plurality of processing units 1508 may be located on a single chip or over multiple chips.

The algorithm comprising of instructions and codes required for the implementation are stored in either the memory unit 1510 or the storage 1512 or both. At the time of execution, the instructions may be fetched from the corresponding memory 1510 or storage 1512, and executed by the processing unit 1508.

In case of any hardware implementations various networking devices 1516 or external I/O devices 1514 may be connected to the computing environment to support the implementation through the networking unit and the I/O device unit.

The embodiments disclosed herein can be implemented through at least one software program running on at least one hardware device and performing network management functions to control the elements. The elements shown in FIGS. 1 through 15 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for optimizing communication in a heterogeneous network, the method comprising:
   forming, by a non-constrained device, an association with a constrained device, in response to receiving an association request broadcasted by the constrained device;
   determining, by the non-constrained device, a sleep time of the constrained device as one of a minimum value of application loads of constrained devices that identify a traffic of the heterogeneous network, or a minimum value of application loads of constrained devices selected for logging the traffic of the heterogeneous network; and
   transmitting, by the non-constrained device, sleep information including the sleep time of the constrained device to the constrained device,
   wherein the non-constrained device sends the sleep information using an acknowledgement message, and
   wherein the sleep information is indicated in a sleep field of the acknowledgement message.

2. The method of claim 1,
   wherein the non-constrained device dynamically determines and transmits the sleep information to the constrained device based on the association when the constrained device wakes up, and
   wherein the sleep information is used for the constrained device to sleep and wake up.

3. The method of claim 1, wherein the acknowledgement message comprises at least one of a warning flag field indicating whether any device needs to access the constrained device, and a traffic flag field indicating traffic information of the heterogeneous network.

4. The method of claim 1, further comprising:
   receiving, by the non-constrained device, a request for the sleep information of the constrained device broadcasted by a controller device;
   transmitting, by the non-constrained device, the sleep information of the constrained device to the controller device, wherein the controller device communicates with the constrained device in response to receiving a wake-up message broadcasted by the constrained device based on the sleep information;
   broadcasting, by the non-constrained device, an association replacement message for replacement of the association with one or more devices to the controller device;
   receiving, by the non-constrained device, a response to the association replacement message from the controller device; and
   sharing, by the non-constrained device, information about the association with the controller device, wherein the controller device associates with the constrained device in response to receiving a wake-up signal broadcasted by the constrained device based on the sleep information.

5. A method for optimizing communication in a heterogeneous network, the method comprising:
   broadcasting, by a constrained device, a message to form an association to a plurality of non-constrained devices in the heterogeneous network;
   receiving, by the constrained device, an acknowledgement message to form the association from the plurality of non-constrained devices;
   computing, by the constrained device, association weightages for each of the non-constrained devices based on at least one parameter related to the each of the non-constrained devices;
   selecting one of the non-constrained devices with a highest association weightage among the association weightages;
   transmitting, by the constrained device, an association request to form the association with the selected non-constrained device;
   receiving, by the constrained device, sleep information of the constrained device from the selected non-constrained device, in response to the association request; and
   operating, by the constrained device, in a sleep mode or a wake-up mode based on the received sleep information,
   wherein the sleep information is a sleep time of the constrained device that is determined as one of a minimum value of application loads of constrained devices that identify a traffic of the heterogeneous network, or a minimum value of application loads of constrained devices selected for logging the traffic of the heterogeneous network.

6. The method of claim 5, further comprising:
   transmitting, by the constrained device, a wake up message to the non-constrained device when the constrained device operates in the wake-up mode based on the sleep information.

7. The method of claim 6, wherein the wake up message comprises a wake-up signal sent to the non-constrained device and a notification flag indicating whether the constrained device has information to notify in the heterogeneous network.

8. The method of claim 5,
   wherein the constrained device receives the sleep information using the acknowledgement message, and
   wherein the sleep information is indicated in a sleep field of the acknowledgement message.

9. The method of claim 8, wherein the acknowledgement message comprises at least one of a warning flag indicating whether any device needs access to the constrained device, and a traffic flag indicating traffic information of the heterogeneous network.

10. A non-constrained device for optimizing communication in a heterogeneous network, the non-constrained device comprising a processor unit configured to:

form an association with a constrained device, in response to receiving an association request broadcasted by the constrained device;

determine a sleep time of the constrained device as one of a minimum value of application loads of constrained devices that identify a traffic of the heterogeneous network, or a minimum value of application loads of constrained devices selected for logging the traffic of the heterogeneous network; and transmit sleep information including the sleep time of the constrained device to the constrained device, wherein the processor unit is further configured to send the sleep information using an acknowledgement message, and wherein the sleep information is indicated in a sleep field of the acknowledgement message.

11. The non-constrained device of claim 10, wherein the non-constrained device dynamically determines and transmits the sleep information to the constrained device based on the association when the constrained device wakes up, and wherein the sleep information is used for the constrained device to sleep and wake up.

12. The non-constrained device of claim 10, wherein the acknowledgement message comprises at least one of a warning flag field indicating whether any device needs to access the constrained device, and a traffic flag field indicating traffic information of the heterogeneous network.

13. The non-constrained device of claim 10, wherein the processor unit is further configured to:

receive a request for the sleep information of the constrained device broadcasted by a controller device;

transmit the sleep information of the constrained device to the controller device, wherein the controller device communicates with the constrained device in response to receiving a wake-up signal message broadcasted by the constrained device based on the sleep information;

broadcast an association replacement message for replacement of the association with one or more devices to the controller device;

receive a response to the association replacement message from the controller device; and share information about the association with the controller device, wherein the controller device associates with the constrained device in response to receiving a wake-up signal broadcasted by the constrained device based on the sleep information.

14. A constrained device for optimizing communication in a heterogeneous network, the constrained device comprising a processor unit configured to:

broadcast a message to form an association to a plurality of non-constrained devices in the heterogeneous network;

receive an acknowledgement message to form the association from the plurality of non-constrained devices;

compute association weightages for each the non-constrained devices based on at least one parameter related to the each of the non-constrained devices;

select one of the non-constrained devices with a highest association weightage among the association weightages;

transmit an association request to form the association with the non-constrained device;

receive sleep information of the constrained device from the selected non-constrained device, in response to the association request; and operate in a sleep mode or a wake-up mode based on the received sleep information, wherein the sleep information is a sleep time of the constrained device that is determined as one of a minimum value of application loads of constrained devices that identify a traffic of the heterogeneous network, or a minimum value of application loads of constrained devices selected for logging the traffic of the heterogeneous network as a sleep time of the constrained device.

15. The constrained device of claim 14, wherein the processor unit is further configured to transmit a wake-up message to the non-constrained device when the constrained device operates in the wake-up mode based on the sleep information.

16. The constrained device of claim 15, wherein the wake-up message comprises a wake-up signal sent to the non-constrained device, and a notification flag indicating whether the constrained device has information to notify in the heterogeneous network.

* * * * *